United States Patent [19]

McKechnie

[11] 4,083,255
[45] Apr. 11, 1978

[54] HYDRO-OPTIC VIBRATION DETECTOR

[75] Inventor: John C. McKechnie, Maitland, Fla.

[73] Assignee: The United States of America as represented by the Secretary of the Navy, Washington, D.C.

[21] Appl. No.: 774,285

[22] Filed: Mar. 4, 1977

[51] Int. Cl.$^2$ ............................................. G01H 3/10
[52] U.S. Cl. ...................................... 73/655; 250/573
[58] Field of Search ...................... 73/71.3, 71.4, 515, 73/516 R, 71.1; 250/573, 574, 577; 356/256

[56] References Cited

U.S. PATENT DOCUMENTS

| | | | |
|---|---|---|---|
| 1,082,014 | 12/1913 | Digby et al. | 73/71.3 |
| 3,159,024 | 12/1964 | Tsien | 73/71.3 |
| 3,404,282 | 10/1968 | Walker | 250/577 |
| 3,908,129 | 9/1975 | Akers | 250/577 |

OTHER PUBLICATIONS

S. Z. Dushkes et al., Measuring Small-Amplitude, High Frequency Motions, IBM Technical Disclosure Bulletin, vol. 12, No. 4, Sept. 69.

*Primary Examiner*—Richard C. Queisser
*Assistant Examiner*—John P. Beauchamp
*Attorney, Agent, or Firm*—Richard S. Sciascia; Don D. Doty

[57] ABSTRACT

A vibration sensing and measuring system is disclosed as including a series connected signal generator, vibration sensor adapted for being connected to any appropriate compatible object from which the vibration information and/or parameters analogous thereto are desired, and utilization apparatus - such as, for example, a readout - for indicating or otherwise utilizng the measured vibrations of said vibrating apparatus. When the aforesaid object vibrates, said sensor vibrates in synchronism therewith; thus a liquid disposed therein is disturbed in such manner as to cause standing waves at the surface thereof that are proportional thereto. The reception by a photodiode (located in said sensor) of light broadcast in a given amount along and in contiguous disposition with the surface of said liquid by a light emitting diode (likewise located in said sensor) is reduced in accordance with the aforesaid standing waves thereof and, by calibration, constitutes a measure of the vibration of said sensor and, hence, the object to which it is connected.

25 Claims, 3 Drawing Figures

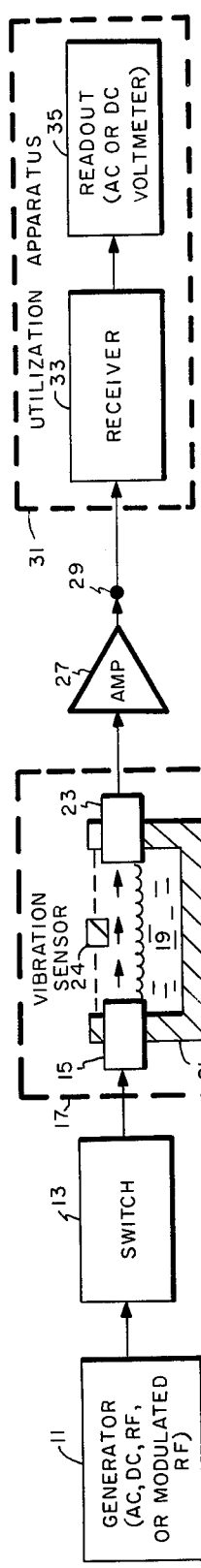
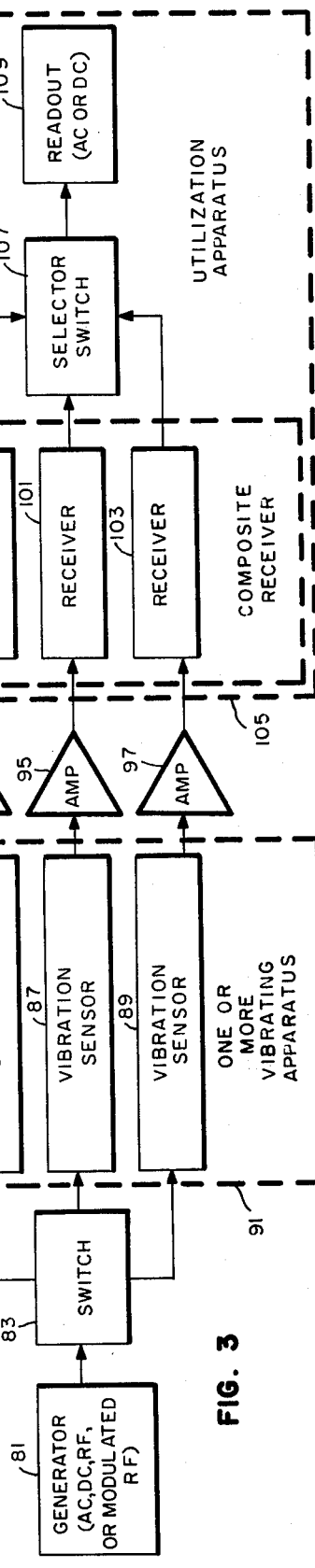
FIG. 1
FIG. 2
FIG. 3

HYDRO-OPTIC VIBRATION DETECTOR

FIELD OF THE INVENTION

The present invention, in general, relates to vibration instruments and, in particular, comprises a unique vibration detection system. In even greater particularity, the subject invention is a liquid-optical vibration detector for sensing and measuring exceedingly low level vibrations, acceleration changes, and motion characteristic changes.

DESCRIPTION OF THE PRIOR ART

Heretofore, numerous devices, instruments, and systems have been employed for the purpose of indicating and measuring vibrations, accelerations and acceleration changes, as well as changes of state or position of many different things. As a matter of fact, such devices are so copious in quantity that the artisan would undoubtedly be aware of most of them. Nevertheless, a few of such devices would, for example, be vibrating reeds, pendulums, accelerometers, strain gauges, and the like. Of course, there are others, too. For instance, U.S. Pat. No. 3,482,436 of D. A. Neish et al., dated Dec. 9, 1969, discloses a rather sophisticated Doppler type Vibration Responsive Apparatus, wherein a laser beam is directed onto a vibrating mirror and variations in the Doppler beat frequency produced by the vibration are detected to reproduce the vibrations waveform. The light from the laser is directed to a surface responsive to incident speech signals and mixed in a balanced optical mixer with light directly from said laser. A detector receives the output from the mixer, and a vibrating mirror that is driven by a vibratory drive shifts the laser light which is applied from the laser directly to the balanced mixer. The output signal therefrom is then differentiated, demodulated, and read out by loudspeaker or recorder.

SUMMARY OF THE INVENTION

Although all of the aforementioned prior art devices are undoubtedly quite useful for many practical purposes, the instant invention ostensively provides some advantages thereover in some operational situations, inasmuch as it is a very low vibration level detector, is relatively low cost, and has a modulated output up to the megahertz frequency. Moreover, its construction is relatively simple and consists of a new combination of elements not found in any known device, including all of the aforesaid prior art devices.

Briefly, the subject invention comprises a generator for producing direct or alternating current (DC or AC) voltages, as well as pulses or continuous radio frequency (RF) carrier waves which are used to light a light emitting diode (LED). Light reflected from the surface of a liquid disposed in a container modulates a receiving photo diode whenever said liquid is vibrated by external means. The output of the aforesaid photo diode is appropriately processed by a compatible receiver device and meter (or other suitable utilization apparatus) which, in turn, produces an analog indication of the amplitude of vibration of said external means. Of course, the calibration of the aforesaid meter may be such as to cause it to read out in any meaningful terms or units.

Hence, it may readily be seen that an object of this invention is to provide an improved vibration detector.

Another object of this invention is to provide a hydro-optic vibration detector that is sensitive to and accurately measures low level deflections and vibrations.

Still another object of this invention is to provide an improved method and means for measuring various parameters which are analogous to or correspond with mechanical vibrations.

A further object of this invention is to provide an improved method and means for determining if a motor is running at a remote location and at what probable speed.

A further object of this invention is to provide a unique method and means for detecting low amplitude vibrations, such as are caused by ground tremors, earthquakes, high-rise building movements during high winds, heavy moving equipment, etc.

Still another object of this invention is to provide a unique method and means for detecting and measuring changes in acceleration of moving devices.

Another object of this invention is to provide a unique system for detecting and measuring changes in gravity vector directions.

Another object of this invention is to provide a unique vibration detector that is easily and economically constructed, used, and maintained.

Other objects and many of the attendant advantages of this invention will be readily appreciated as the same becomes better understood by reference to the following detailed description when considered in connection with the accompanying drawing wherein:

BRIEF DESCRIPTION OF THE DRAWING

FIG. 1 is a basic block and schematic diagram of the subject invention;

FIG. 2 is a block and schematic diagram of another species of the vibration detection system constituting this invention; and FIG. 3 illustrates a system in which the instant invention may be incorporated, in order to effect the sensing and measuring of vibrations at more than one place on a single vibrating apparatus or on more than one vibrating platform or apparatus.

DESCRIPTION OF THE PREFERRED EMBODIMENTS

Referring now to FIG. 1, the instant invention is depicted as incorporating a generator 11, which, without limitation, may be any type of electrical generator that is compatible with the rest of the system. For instance, it may be an alternating current (AC) generator, it may be a direct current (DC) generator, it may be a radio frequency (RF) generator, it may be a modulated radio frequency generator, it may be a programmed or other pulsed generator, or it may be a continuously operating generator, fixed or variable frequency generator, or any appropriate combination thereof which would make it useful for any given operational circumstances.

The output of generator 11 is connected to the input of a switch 13, which may, likewise without limitation, be any suitable switch that is compatible with the aforesaid generator 11. For example, it may merely be an on - off switch, or it may be a selector switch, or the like. The output of selector switch 13 is connected to the electrical input of an energy transducing and radiating device, such as a light emitting diode (LED) 15 which, of course, constitutes the electrical input of vibration sensor 17, too.

Vibration sensor 17 comprises a pool of liquid 19 — such as, for instance, water, oil, mercury, or any other liquid that forms a reflecting surface — that is disposed in any suitable container 21 in such manner that, when container 21 is mechanically vibrated, liquid 19 is vibrated, too, thereby causing standing and/or other waves or ripples to occur at the surface thereof which raises portions thereof above the surface thereof that would exist if liquid 19 were in a quiescent state as a consequence of not being subjected to said mechanical vibrations. The geometrical configuration of container 21 may be any which is most useful for any given operational purpose; hence, it may have an open top or be completely closed, so that liquid 19 cannot splash out. In any event, however, the aforementioned LED 15 should extend through one wall of container 21 and be held there by any conventional manner and in such way that the light emitting output thereof is in contiguous disposition with the surface of liquid 19 when it is in its quiescent state.

Another energy transducing device, such as a photodiode 23, is conventionally mounted through another wall of container 21 in such manner that the light input thereof is contiguously disposed with (or reflected from) the surface of liquid 19 when it is in its quiescent state and in alignment with the light output of LED 15.

As suggested above, light emitting diode 15 and photodiode 23 are both energy transducing devices, with the former converting electrical energy to light energy proportional thereto, and with the latter converting light energy into electrical energy proportional thereto; however, it should be understood that any other transducing devices — having frequency responses anywhere between DC and a megahertz — may be substituted therefor without violating the spirit or scope of the invention, and an optional light stop 24 may be partially inserted therebetween, if so desired.

Obviously, it would be well within the purview of the artisan having the benefit of the teachings presented herewith to select whatever liquid 19 and transducers 15 and 23 associated therewith would optimize the subject invention for any given use or operational circumstances. Accordingly, the so doing thereby would ostensively be worthy of note at this time.

A light stop 24 optionally connected to the inside of the aforesaid container is effectively disposed in such manner that it partially interferes with - and, thus, provides some predetermined control of - the light projected by light emitting diode 15, as it travels toward photodiode 23.

Vibration sensor 17, of course, is (either directly or indirectly) connected in a mechanical manner to a vibrating apparatus 25, the vibrations or states or disposition of which is desired to be sensed and measured, or otherwise become known. Obviously, it may be anything capable of having sensor 17 mounted thereon or effectively connected thereto.

The output of vibration sensor 17 is electrical in nature and is taken from the electrical signal output of photodiode 23. It is connected through any suitable amplifier 27 to an output terminal 29 which, in turn, may be connected to the input of any utilization apparatus 31.

In this particular case, output terminal 29 is, in fact, connected to a receiver 33 which converts the electrical signal received therefrom to one having such useful level and shape as will facilitate further data processing thereof; and the output of said receiver 33, likewise being an electrical signal output, is connected to the input of a readout 35. Of course, readout 35 may be an AC or DC voltmeter — or any other suitable meter, for that matter — or it could be any other indicator, recorder, or the like, such as, for instance, an oscilloscope or oscillograph, an accelerometer, tilt meter, or low frequency — high amplitude indicator or recorder. As long as readout 35 is compatible with the aforesaid generator 11 and/or receiver 33, and as long as it reads out in terms of a useful nature, it may be any of such suitable devices selected by the artisan, in order to optimize the invention for any given purpose.

Referring now to FIG. 2, it may readily be seen that some of the elements and components disclosed therein are identical to some of the elements and components of the embodiment of the invention shown in FIG. 1. Therefore, in order to keep this disclosure as simple as possible, it is hereby stated that generator 41, switch 43, LED 45, liquid 49, photodiode 53, light stop 54, and amplifier 57 are preferably substantially identical to, but may be physically disposed in manners that are the same as or different from, generator 11, switch 13, LED 15, vibration sensor 17, liquid 19, photodiode 23, and amplifier 27, respectively. Of course, container 51 may have a curved bottom — for surface light reflection purposes — and include a light stop 54, if so desired, and vibrating apparatus 55 may be the same as or different from vibrating apparatus 25, as would be obvious to the artisan.

Consequently, as may readily be seen from FIG. 2, receiver 33 of FIG. 1 has been replaced by a telemetering system 59, the latter being connected to the output of the aforementioned amplifier 57. Of course, as also may be seen, the input component of telemetering system 59 is a transmitter 61, the input of which is, in fact, connected to the output of amplifier 57. The output of transmitter 61 is connected to a transmitting transducer of appropriate design, such as, for example, an atenna 63, which broadcasts a suitable signal 65 through any environmental medium 67 compatible therewith to a receiving transducer, such as, for example, an atenna 69. The output of antenna 69 is connected to the input of a receiver 71 which may or may not be similar to the aforementioned receiver 33, as circumstances warrant or dictate. A readout 73 — such as an AC or DC voltmeter or other meter or utilization apparatus — is connected to the output of receiver 71. Obviously, it may be any one or more of the devices mentioned in conjunction with readout 35 of FIG. 1, too.

In this particular species of the invention disclosed in FIG. 2, the aforementioned telemetering system 59 (comprising transmitter 61, antennas 63 and 69, and receiver 71) and readout 73 are combined to form a utilization apparatus 75. However, such combination is, in fact, intended to be exemplary only and, thus, without intended limitation.

FIG. 3 portrays a system essentially incorporating a plurality of the devices of FIG. 1, and with changes as shown, could be considered as including one or more of the devices illustrated in FIG. 2, as well. However, for most practical purposes, and in order to simplify this disclosure, most of the components of FIG. 3 are respectively similar to those of FIG. 1. Nevertheless, more specifically, the system of FIG. 3 contains a generator 81, the output of which is connected to the input of a selector switch 83, the outputs of which are connected to a trio of vibration sensors 85, 87, and 89, each of which are mounted on one or more vibrating apparatus 91.

Vibration sensors 85, 87, and 89, in this particular case, are intended to be identical to vibration sensors 17 of FIG. 1 and/or 47 of FIG. 2, and, furthermore, they should be effectively similar to each other. Also, whether each of said vibration sensors is mounted on a different vibrating apparatus or on the same apparatus is left to the discretion of the artisan. Moreover, although only three vibration apparatuses are disclosed herewith, it should be understood that any number thereof may be so used or incorporated in the system of FIG. 3.

The outputs of said vibration sensors 85, 87, and 89 are respectively connected to the inputs of amplifiers 93, 95, and 97, and the outputs thereof are respectively connected to the inputs of a trio of receivers 99, 101, and 103, the latter of which may be separate receivers or receiver units of a single composite receiver 105.

The outputs of receivers 99, 101, and 103 — or composite receiver 105, as the case may be — are respectively connected to the inputs of a selector switch 107, the output of which is connected to the input of a readout 109. Again, readout 109 may be any suitable readout compatible with generator 81 and/or receivers 99, 101, and 103, and, thus, may or may not be similar to the aforementioned receivers 35 and 73 of FIGS. 1 and 2, respectively.

In the particular system depicted in FIG. 3, receivers 99, 101, and 103, selector switch 107, and readout 109 are combined are a utilization apparatus 111; however, it should be understood that utilization apparatus 31 and/or utilization apparatus 75 or any other utilization apparatus of compatible nature may be substituted therefor, if so desired by the artisan.

At this time, it would perhaps be noteworthy that all of the components and elements portrayed in block form in FIGS. 1, 2, and 3, except vibration sensors 17, 47, 85, 87, and 89, are well known and conventional per se. Therefore, it is to be understood that it is their respective unique combinations, including the aforesaid unique vibration sensors, that effect the subject invention and cause it to produce the results stated above, which, in turn, for some practical purposes, causes it to constitute an advancement in the art.

MODE OF OPERATION

The operation of the invention is exceedingly simple but nevertheless very important from the standpoint of the results produced thereby. Thus, it will now be discussed briefly in conjunction with FIGS. 1 through 3.

Considering the system of FIG. 1 first, generator 11 produces, at any given time, one of several types of electrical output signals. As previously indicated, said output signals may be AC, DC, RF carrier wave, modulated RF carrier wave, pulsed or non-pulsed signals, or some combination thereof. For the sake of simplicity of disclosure, let it be assumed that generator 11 produces an AC modulated carrier wave signal which, when switch 13 is closed, is supplied to LED 15. Accordingly, LED 15 emits a light proportional thereto which is directed (and perhaps partially controlled by light stop 24) along a straight and/or reflected path toward photodiode 23. Photodiode 23, in turn, produces an electrical signal at the output thereof that is proportional to the amount of light received thereby. Whenever liquid 19 is in a quiescent state, a maximum of light passes from LED 15 to photodiode 23 because nothing is in its path therebetween, and at that time, the surface of liquid 19 also reflects a maximum amount of whatever light strayed thereto toward the light responsive input of photodiode 23. But, when the surface of liquid 19 is upset because liquid 19 is effectively being vibrated by the mechanical vibration of vibration apparatus 25, the resulting ripples or waves — standing or otherwise — interfere with the passing of light from LED 15 to photodiode 23 to some extent. The amount of light received by photodiode 23 — being modulated by the liquid surface vibration — is inversely proportional to the amplitude of the liquid waves which is directly proportional to the amplitude of vibration of apparatus 25, regardless of what it may be. Of course, as also previously suggested, the amount of vibration of apparatus 25 may be analogous to other parameters pertinent thereto, such as, for instance, the running of motors and at what probable speed, and the presence and intensities of earthquakes.

In any event, the electrical equivalent of the light received by photodiode 23 is then amplified to a more useful level by amplifier 27 and converted to a more useful signal — perhaps by detector operation and filtering — by receiver 23 before being supplied to readout 35. In this instance, if readout 35 is a voltmeter, it should be a DC voltmeter that is calibrated in terms of vibration amplitude, or in other meaningful terms desired by the operator using the invention for some intended purpose.

The operation of the system of FIG. 2 is practically identical to that of FIG. 1 through amplifier 57 and up to telemetering system 59. Transmitter 61 supplies a light equivalent electrical signal in a conventional manner to transmitting antenna 63 for broadcast thereby through the atmosphere 67 — or other environment medium, as the case may be — to receiving antenna 69, from which it is converted by receiver 71 into a signal more suitable to be read out by readout 73, where it is read out in terms of the amplitude of vibration of vibrating object 55.

The system of FIG. 3 performs in a manner similar to that of FIG. 1, except there are a plurality of sensors 85, 87, and 89 and associated parts which enable it to sense and measure the amplitudes of vibrations occurring at several different places, either on one apparatus or several, and then read them out either collectively in any desired combination, individually at the same time, or one at a time, as desired by the operator. The incorporation of sensors similar to the aforesaid vibration sensors 17 and 47 in the device of FIG. 3 — say, as vibration sensors 85, 87, 89 — improves the vibration sensibilities thereof sufficiently to make it a unique advancement in the art and, thus, implement or accomplish the aforementioned objectives. Obviously, although only three of such sensors are illustrated in FIG. 3, any number thereof may be employed therein merely by making whatever design choices as would be necessary with respect to the other components associated therewith to reduce or increase the number thereof, since so doing would not violate the spirit or scope of the invention.

Obviously, many modifications and variations of the present invention are possible in the light of the above teachings. It is therefore to be understood that within the scope of the appended claims the invention may be practiced otherwise than as specifically described.

What is claimed:

1. A vibration detector, comprising in combination:

means for generating a first predetermined electrical signal;

a container means having at least a pair of oppositely disposed walls;

liquid means disposed within said container means in such manner as to cause the surface thereof to be at a certain level therein when said liquid means is in a quiescent state;

radiant energy generating means effectively electrically connected to the output of said first predetermined electrical signal generating means and mounted in and extending through one of the oppositely disposed walls of said container means in such manner that one portion of the periphery thereof is in contiguous disposition with the surface of said liquid means when said liquid means is in a quiescent state, and so as to permit the broadcast of the radiant energy generated thereby in a predetermined direction along the aforesaid liquid surface in response to said first predetermined electrical signal;

means mounted in and extending through the other of said oppositely disposed walls of said container means in such manner that one portion of the periphery thereof is in contiguous disposition with the surface of said liquid means when said liquid means is in a quiescent state, and so as to permit the reception of radiant energy broadcast by the aforesaid radiant energy generating means and for generating a second electrical signal proportional thereto; and utilization apparatus means effectively connected to the output of said radiant energy reception means for response to the aforesaid second electrical signal generated thereby.

2. The device of claim 1, wherein said means for generating a first predetermined electrical signal comprises an alternating current signal generator.

3. The device of claim 1, wherein said means for generating a first predetermined electrical signal comprises a direct current signal generator.

4. The device of claim 1, wherein said means for generating a first predetermined electrical signal comprises a radio frequency signal generator.

5. The device of claim 1, wherein said means for generating a first predetermined electrical signal comprises a modulated radio frequency generator.

6. The device of claim 1, wherein said container means comprises an open top container.

7. The device of claim 1, wherein said container means comprises a closed container.

8. The device of claim 1, wherein said liquid means comprises water.

9. The device of claim 1, wherein said liquid means comprises oil.

10. The device of claim 1, wherein said liquid means comprises mercury.

11. The device of claim 1, wherein said radiant energy generating means comprises a light emitting diode.

12. The device of claim 1, wherein said radiant energy reception means comprises a photodiode.

13. The device of claim 1, wherein said utilization apparatus means comprises:
a transmitter;
a transmitting transducer connected to the output of said transmitter and disposed within a predetermined environmental medium;
a receiving transducer disposed within the aforesaid predetermined environmental medium;
a receiver connected to the output of said receiving transducer; and
a readout connected to the output of said receiver.

14. The invention of claim 1, further characterized by a vibrating apparatus effectively connected to the aforesaid container means for effecting the vibration thereof.

15. The device of claim 1, wherein said utilization apparatus means comprises:
a receiver; and
a readout connected to the output of said receiver.

16. The device of claim 15, wherein said readout comprises an alternating current voltmeter.

17. The device of claim 15, wherein said readout comprises a direct current voltmeter.

18. A vibration sensing and measuring system, comprising in combination:
a generator for producing a first electrical signal;
a container having walls, said container being capable of being vibrated by a vibrating apparatus;
a predetermined liquid disposed within said container in such manner that the surface thereof is located at a predetermined level therein;
a light emitting diode effectively electrically connected to the output of said electrical generator and mounted on one of the walls of said container in such manner as to shine the light emitted thereby along the surface of said liquid in response to said first electrical signal;
a photodiode mounted on another of the walls of said container in such manner as to receive light emitted by the aforesaid light emitting diode and produce a second electrical signal proportional thereto; and
means effectively connected to the output of said photodiode for reading out said second signal in predetermined meaningful terms.

19. The device of claim 18, wherein said predetermined liquid disposed within said container in such manner that the surface thereof is located at a predetermined level therein comprises oil.

20. The device of claim 18, wherein said predetermined liquid disposed within said container in such manner that the surface thereof is located at a predetermined level therein comprises mercury.

21. The device of claim 18, wherein said predetermined liquid disposed within said container in such manner that the surface thereof is located at a predetermined level therein comprises water.

22. The device of claim 18, wherein said means effectively connected to the output of said photodiode for reading out said second signal in predetermined meaningful terms comprises a voltmeter calibrated in terms of amplitude of vibration of the aforesaid vibrating apparatus.

23. A vibration sensing and measuring instrument, comprising in combination:
an electrical signal generator;
a selector switch connected to the output of said electrical signal generator;
a vibration sensor, said vibration sensor including: a container capable of being connected to a vibrating apparatus for the vibration thereof thereby; a predetermined light reflective liquid disposed within said container in such manner that the reflective surface thereof is located at a predetermined level therein when said vibration sensor is in a quiescent state; a light emitting diode electrically connected to the output of the aforesaid selector switch and mounted within said container in such manner as to shine the light emitted thereby along the reflective surface of said liquid and thus be reflected thereby in response to the energization thereof by the aforesaid electrical signal generated by said electrical signal generator; a photodiode mounted within said container in such manner as to receive light emitted by said light emitting diode and reflected from the surface of said reflective liquid and to produce an electrical signal proportional thereto;

an amplifier connected to the output of the photodiode of said vibration sensor for amplifying the electrical signal produced thereby to a more useful level; and a predetermined utilization apparatus connected to the output of said amplifier.

24. The device of claim 23, wherein said predetermined utilization apparatus comprises a readout that is calibrated in terms of the amplitude of vibration of the aforesaid vibrating apparatus.

25. The invention of claim 23, further characterized by a light stop effectively connected to said container in such manner as to be partially disposed between the light emitting diode and the photodiode of said vibration sensor, so as to limit the light transfer therebetween a predetermined amount, regardless of the attitude of said container.

* * * * *